(12) United States Patent
Yasuda

(10) Patent No.: US 12,201,101 B2
(45) Date of Patent: Jan. 21, 2025

(54) BRAKING DEVICE THAT BRAKES SPOOL AND FISHING REEL PROVIDED WITH THE SAME

(71) Applicant: GLOBERIDE, Inc, Tokyo (JP)

(72) Inventor: Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/539,621

(22) Filed: Dec. 14, 2023

(65) Prior Publication Data

US 2024/0107990 A1     Apr. 4, 2024

Related U.S. Application Data

(63) Continuation of application No. 17/890,043, filed on Aug. 17, 2022, now Pat. No. 11,930,800.

(30) Foreign Application Priority Data

Aug. 27, 2021    (JP) ................................ 2021-138524

(51) Int. Cl.
    *A01K 89/01*          (2006.01)
    *A01K 89/0155*      (2006.01)

(52) U.S. Cl.
    CPC .............................. *A01K 89/01555* (2013.01)

(58) Field of Classification Search
    CPC .......... A01K 89/01555; A01K 89/0173; A01K 89/033
    See application file for complete search history.

(56) References Cited

U.S. PATENT DOCUMENTS

| | | | |
|---|---|---|---|
| 4,779,814 A | 10/1988 | Uetsuki et al. | |
| 4,821,975 A | 4/1989 | Uetsuki et al. | |
| 6,412,722 B1 | 7/2002 | Kreuser et al. | |
| 2004/0140163 A1 | 7/2004 | Ikuta et al. | |

(Continued)

FOREIGN PATENT DOCUMENTS

| | | | | |
|---|---|---|---|---|
| CN | 1650704 A | * | 8/2005 | ....... A01K 89/01555 |
| CN | 106417204 A | | 2/2017 | |

(Continued)

OTHER PUBLICATIONS

Aug. 9, 2024 Office Action issued in Chinese Patent Application No. 202211018563.4.

(Continued)

*Primary Examiner* — Emmanuel M Marcelo
(74) *Attorney, Agent, or Firm* — Oliff PLC

(57) ABSTRACT

A braking device of a double bearing reel that brakes a spool rotatably mounted on a reel body of a double bearing reel on which a fishing line may be wound, the braking device provided with a braked unit attached to the spool, a braking unit that applies a braking force to the braked unit, an adjustment unit capable of adjusting the braking force of the braking unit, a control unit that controls the adjustment unit, a power supply unit that supplies electric power to the control unit, and a remaining amount detection unit that detects a remaining amount of the power supply unit, in which the control unit adjusts the adjustment unit to achieve a predetermined braking force value or sets a predetermined braking force value to a set value in a case where the remaining amount of the power supply becomes a predetermined value or smaller.

10 Claims, 5 Drawing Sheets

(56) References Cited

U.S. PATENT DOCUMENTS

| | | |
|---|---|---|
| 2006/0169813 A1 | 8/2006 | Nakagawa et al. |
| 2007/0108330 A1 | 5/2007 | Ikuta et al. |
| 2009/0095835 A1* | 4/2009 | Beckham ........... A01K 89/0155 |
| | | 242/286 |
| 2010/0006686 A1 | 1/2010 | Yusa et al. |
| 2018/0199554 A1 | 7/2018 | Ogose et al. |
| 2020/0165109 A1 | 5/2020 | Niitsuma |

FOREIGN PATENT DOCUMENTS

| | | | |
|---|---|---|---|
| JP | H04-051581 Y | | 12/1992 |
| JP | 2005253354 A | * | 9/2005 |
| JP | 3977748 B2 | | 9/2007 |
| JP | 2017055712 A | * | 3/2017 |
| JP | 2019000031 A | * | 1/2019 |
| JP | 2021170984 A | * | 11/2021 |
| KR | 20210000440 U | | 2/2021 |
| WO | 2018194026 A1 | | 10/2018 |

OTHER PUBLICATIONS

Sep. 29, 2024 Notice of Preliminary Rejection issued in Korean Application No. 10-2022-0102569.

\* cited by examiner

BRAKING DEVICE THAT BRAKES SPOOL AND FISHING REEL PROVIDED WITH THE SAME

CROSS-REFERENCE TO RELATED APPLICATIONS

This application is a Continuation of application Ser. No. 17/890,043 filed Aug. 17, 2022. This application also claims priority under 35 U.S.C. § 119 to Japanese Patent Application No. 2021-138524 filed on Aug. 27, 2021, in the Japanese Patent Office. The entireties of these prior applications are hereby incorporated by reference herein.

BACKGROUND

The present disclosure relates to a braking device, especially a braking device of a double bearing reel that brakes a spool rotatably mounted on a reel body, and a fishing reel provided with the same.

FIELD

Conventionally, a braking device that brakes a spool for preventing backlash at the time of casting (throwing) is provided on a double bearing reel, especially a bait casting reel in which a device such as a lure is mounted on a tip of a fishing line for casting. As the braking device of this type, there is a braking device in which a magnet is rotated by a motor to automatically adjust backlash prevention adjustment as disclosed in JP 4-051581 U.

In JP 4-051581 U, a CPU calculates a rotational speed and rotational acceleration of a spool by a signal from a sensor that detects rotation of the spool and a signal of a timer circuit, and compares the rotational speed and the rotational acceleration with data at each fixed time, so that it is possible to extend a flying distance of a device by braking the spool by generating an eddy current in a non-magnetic conductor when a difference of a certain value or larger is generated. In such braking device, an intermittent gear is pivotally supported on a reel body in a rotatable manner, and the intermittent manual gear is meshed with a motor shaft gear or a magnet gear in a disengageable manner, so that manual adjustment may be performed when desired even when a battery of the motor is exhausted.

SUMMARY

However, in the braking device according to JP 4-051581 U, since it is necessary to arrange the intermittent manual gear in the vicinity of an exterior portion of the reel in order to enable user operation, there is restriction that another part cannot be arranged outside the same, so that there has been a problem that the reel becomes large in size.

The present disclosure is achieved in view of the above-described circumstances, and an object thereof is to prevent backlash and continue fishing even in a case where a battery is exhausted by a method that does not cause an increase in size of a fishing reel in a braking device of a spool capable of adjusting a braking force. Other objects of the present disclosure will become apparent by reference to the entire specification.

A braking device of a double bearing reel according to one embodiment of the present disclosure is a braking device of a double bearing reel that brakes a spool rotatably mounted on a reel body of a double bearing reel on which a fishing line may be wound, the braking device provided with a braked unit attached to the spool, a braking unit that applies a braking force to the braked unit, an adjustment unit capable of adjusting the braking force of the braking unit, a control unit that controls the adjustment unit, a power supply unit that supplies electric power to the control unit, and a remaining amount detection unit that detects a remaining amount of the power supply unit, in which the control unit adjusts the adjustment unit to achieve a predetermined braking force value or sets a predetermined braking force value to a set value in a case where the remaining amount of the power supply becomes a predetermined value or smaller.

In the braking device of the double bearing reel according to one embodiment of the present disclosure, the control unit turns off the power supply unit after adjusting the adjustment unit to achieve a predetermined braking force value or setting to a predetermined braking force value in a case where a battery remaining amount becomes a predetermined value or smaller.

In the braking device of the double bearing reel according to one embodiment of the present disclosure, the predetermined braking force value is a maximum braking value of the braking unit.

The braking device of the double bearing reel according to one embodiment of the present disclosure is further provided with a reduction mechanism, in which, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r<Mmax/C is satisfied, in a case where Mmax/T<r<Mmax/C is satisfied, the predetermined braking force value is a maximum braking force value of the braking unit, and the control unit adjusts the adjustment unit to achieve the maximum braking force value or sets the maximum braking force value to the set value and turns off the power supply unit in a case where the remaining amount of the power supply becomes a predetermined value or smaller.

In the braking device of the double bearing reel according to one embodiment of the present disclosure, in a case of setting the maximum braking force value to the set value, the braking unit is configured to generate the maximum braking force after the power supply is turned off.

In the braking device of the double bearing reel according to one embodiment of the present disclosure, in a case where a battery remaining amount becomes a predetermined value or smaller, the control unit turns off the power supply unit after adjusting the adjustment unit to achieve a predetermined braking force value or without adjusting.

In the braking device of the double bearing reel according to one embodiment of the present disclosure, the predetermined braking force value is a braking force value after adjustment or a braking force value when the battery remaining amount becomes a predetermined value or smaller.

The braking device of the double bearing reel according to one embodiment of the present disclosure is further provided with a reduction mechanism, in which, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r and Mmax/C<r are satisfied, and in a case where Mmax/T<r and Mmax/C<r are satisfied, the control unit turns off the power supply unit after adjusting the adjustment unit to achieve a predetermined braking force value or without adjusting in a case where a battery remaining amount becomes a predetermined value or smaller.

In the braking device of the double bearing reel according to one embodiment of the present disclosure, the braking unit may apply the braking force even in a case where there is no electric power supply to the control unit.

A braking device of a double bearing reel according to one embodiment of the present disclosure is a braking device of a double bearing reel that brakes a spool rotatably mounted on a reel body of a double bearing reel on which a fishing line may be wound, the braking device provided with a braked unit attached to the spool, a braking unit that applies a braking force to the braked unit, a motor capable of driving a part of the braking unit, a reduction mechanism that transmits drive of the motor to a part of the braking unit, a control unit that controls the motor, a power supply unit that supplies electric power to the motor, and a remaining amount detection unit that detects a remaining amount of the power supply unit, in which, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r<Mmax/C is satisfied or Mmax/T<r and Mmax/C<r are satisfied, and in a case where it is determined that Mmax/T<r<Mmax/Cr is satisfied, the control unit adjusts the adjustment unit to achieve a maximum braking force value or sets the maximum braking force value to a set value and turns off the power supply unit in a case where the remaining amount of the power supply becomes a predetermined value or smaller, and in a case where it is determined that Mmax/T<r and Mmax/C<r are satisfied, the control unit turns off the power supply unit after adjusting the adjustment unit to achieve a predetermined braking force value or without adjusting in a case where a battery remaining amount becomes a predetermined value or smaller.

A fishing reel according to one embodiment of the present disclosure is provided with any one of the above-described braking devices.

According to above-described embodiment, it becomes possible to provide a braking device capable of reliably preventing backlash and continuing fishing and a fishing reel provided with the same even in a case where a battery is exhausted by a method that does not cause an increase in size of the fishing reel.

DETAILED DESCRIPTION

Hereinafter, an embodiment of a braking force control device and a fishing reel provided with the same according to the present disclosure is specifically described with reference to the accompanying drawings. Components common in a plurality of drawings are assigned with the same reference signs throughout the plurality of drawings. Note that, the drawings are not necessarily drawn to scale for convenience of description.

Figure 1:
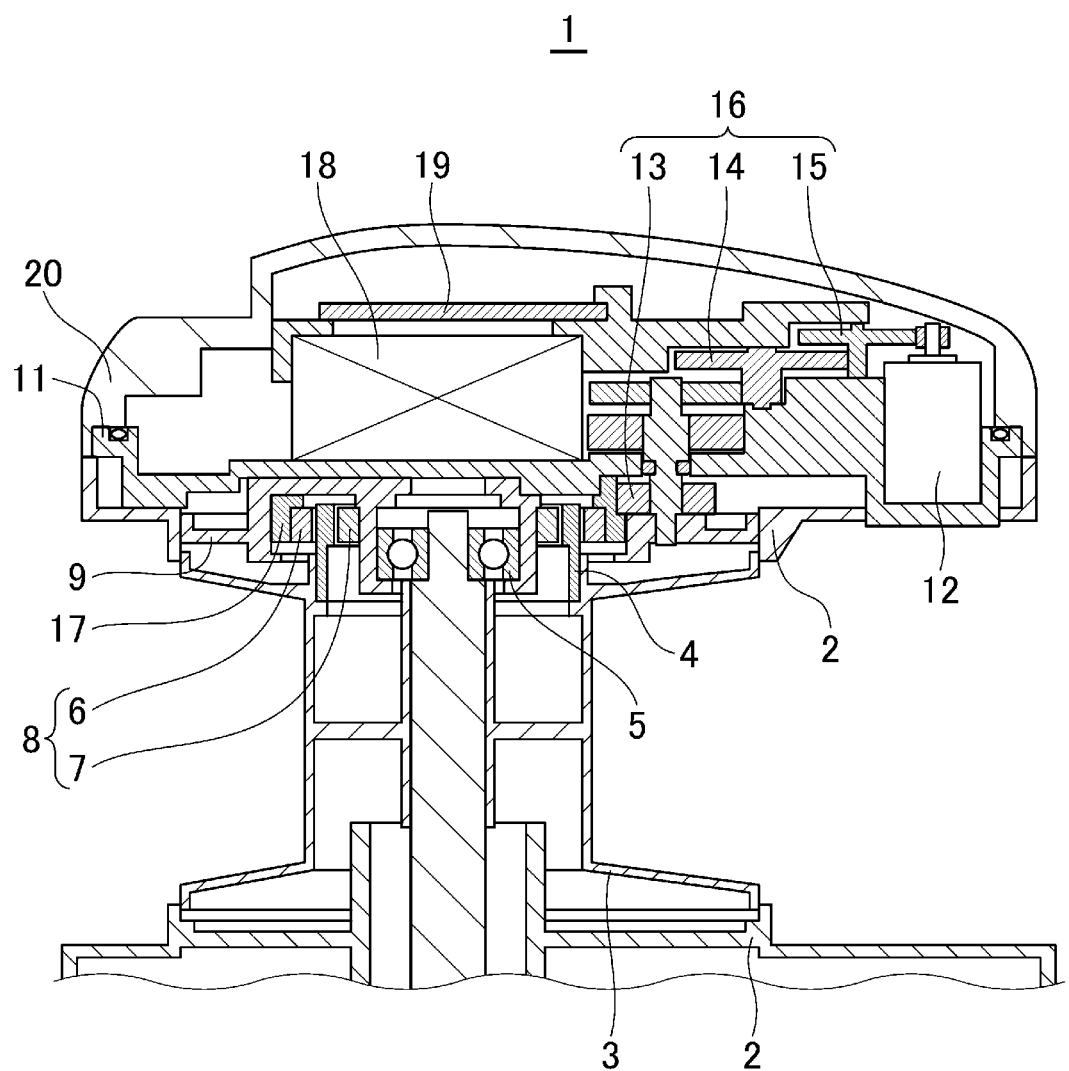
FIG. 1 is a view for illustrating a fishing reel provided with a braking device according to one embodiment of the present disclosure.

A braking device of a double bearing reel and a fishing reel provided with the same according to one embodiment of the present disclosure are described with reference to FIGS. 1 to 5. First, FIG. 1 is a cross-sectional view of a fishing reel 1 taken along a central axis of a reduction gear train to be described later. Note that, for the sake of simplicity of description, some of known functions of the fishing reel 1 are not illustrated or described.

As illustrated in FIG. 1, the fishing reel 1 according to one embodiment of the present disclosure is formed of a frame (reel body) 2, a spool 3, a braked unit (braked means) 4, a bearing 5, a braking unit (braking means) 8 including a rotating magnet 6 and a fixed magnet 7, a set plate 9, an inner lid 11, a motor 12, a reduction mechanism (reduction gear train) 16 including a gear 13, a gear 14, and a gear 15, a magnet gear 17, a battery 18, a control board 19, and an outer lid 20. Herein, a braking device according to one embodiment of the present disclosure described later includes the braked unit 4 and the braking unit 8 including the rotating magnet 6 and the fixed magnet 7, but may include other components.

The frame (reel body) 2 may be attached to a fishing rod (not illustrated). The fishing reel 1 includes an operation means (handle) not illustrated as is the case with a conventional fishing reel and may wind a fishing line by rotating the spool in a forward direction by a user operation. Rotation of the handle is transmitted to the spool by a transmission means such as a gear not illustrated.

The fishing reel 1 includes a clutch means not illustrated, and a user may select connection and disconnection of power transmission to the spool by operating the clutch means. In a connected state, winding by the operation means is possible. In a disconnected state, the spool may be freely rotated in forward and backward directions, and the fishing line may be released.

The fishing reel 1 may also be provided with a drag means (not illustrated) that prevents breakage of the fishing line by sliding the spool when torque of a predetermined value or larger is applied, and a reverse rotation prevention means (not illustrated) that prevents reverse rotation of the handle. Furthermore, an oscillator device (not illustrated) that uniformly winds the fishing line by reciprocating a position of a guide unit that guides the fishing line according to the rotation of the spool may be provided.

The spool 3 is supported so as to be rotatable with respect to the reel body 2, and may wind the fishing line on an outer periphery thereof by rotating in a forward direction. When casting (throwing) a lure and the like, this releases the wound fishing line by rotating in a backward direction. When a release amount of the fishing line is too much larger than a movement amount of the lure and the like at that time, line entanglement referred to as backlash occurs by an excessive line and hinders normal use of the fishing reel 1. Therefore, an appropriate braking force is applied to the spool 3 by a braking device 10 to be described later to prevent the backlash.

The braked unit (induct rotor) 4 is fixed coaxially and non-rotatably with respect to the spool 3, so that braking torque may be applied to the spool 3. The braked unit 4 is made of a conductor such as aluminum, copper, or iron, for example, and is formed into a substantially cylindrical shape. In the braking device 10 according to one embodiment of the present disclosure, a so-called eddy current brake that applies a braking force by an eddy current generated in the braked unit 4 is used. That is, when a magnetic field is applied to the braked unit 4 from the outside, the eddy current is generated in the braked unit during motion. An interaction between the eddy current and the magnetic field generates the braking torque proportional to an angular speed of the spool 3 and intensity of the magnetic field.

The set plate 9 illustrated in FIG. 1 may be fixed to the frame 2. When the set plate 9 is fixed to the frame 2, the spool 3 is rotatably and pivotally supported. The fixed magnet 7 and the rotating magnet (movable magnet) 6 are held by the set plate 9 to form the braking device 10 to be described later. A side plate unit may be formed by integrating the set plate 9, the inner lid 11, and the outer lid 20. A watertight chamber is formed of the inner lid 11 and the outer lid 20, and electric parts such as the board, battery, motor, and sensor may be housed in the watertight chamber.

Next, a configuration of the braking device 10 according to one embodiment of the present disclosure is described. In the braking device 10 according to one embodiment of the present disclosure, the magnetic field is applied to the braked unit by a magnetic circuit including at least one permanent magnet. Two permanent magnets form the magnetic circuit, and the magnetic field applied to the braked unit may be adjusted by relatively moving the permanent magnets by an adjustment unit to be described later.

Figure 2A:
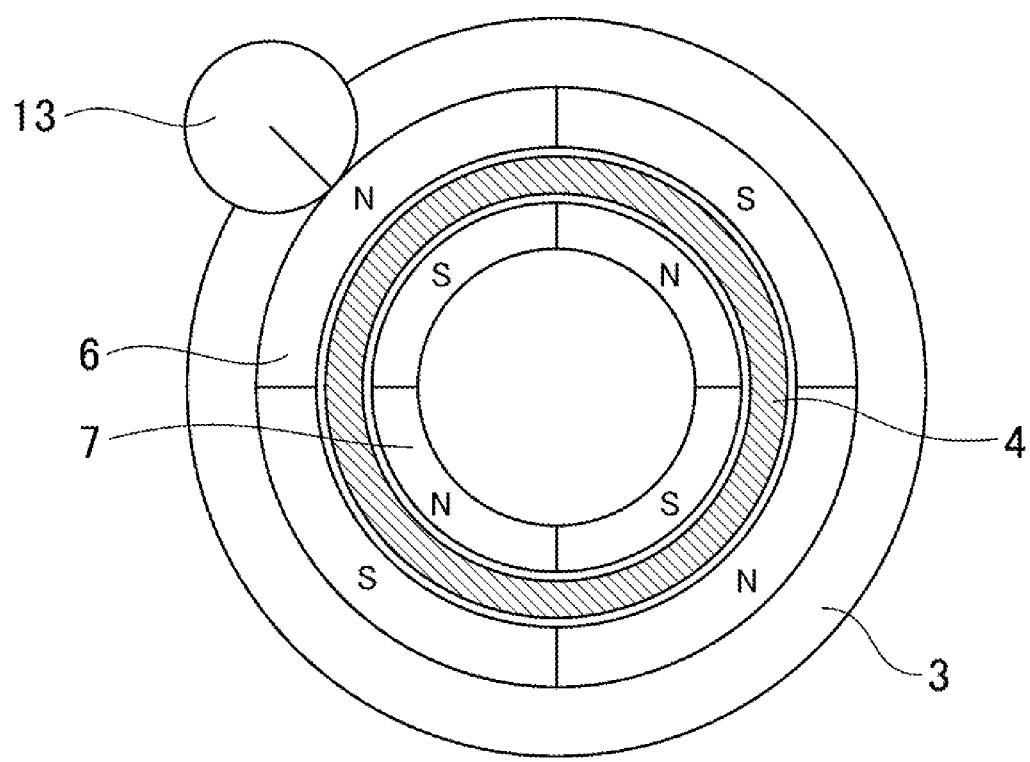
FIGS. 2A and 2B are views illustrating a configuration of the braking device according to one embodiment of the present disclosure or the braking device in the fishing reel.
Figure 2B:
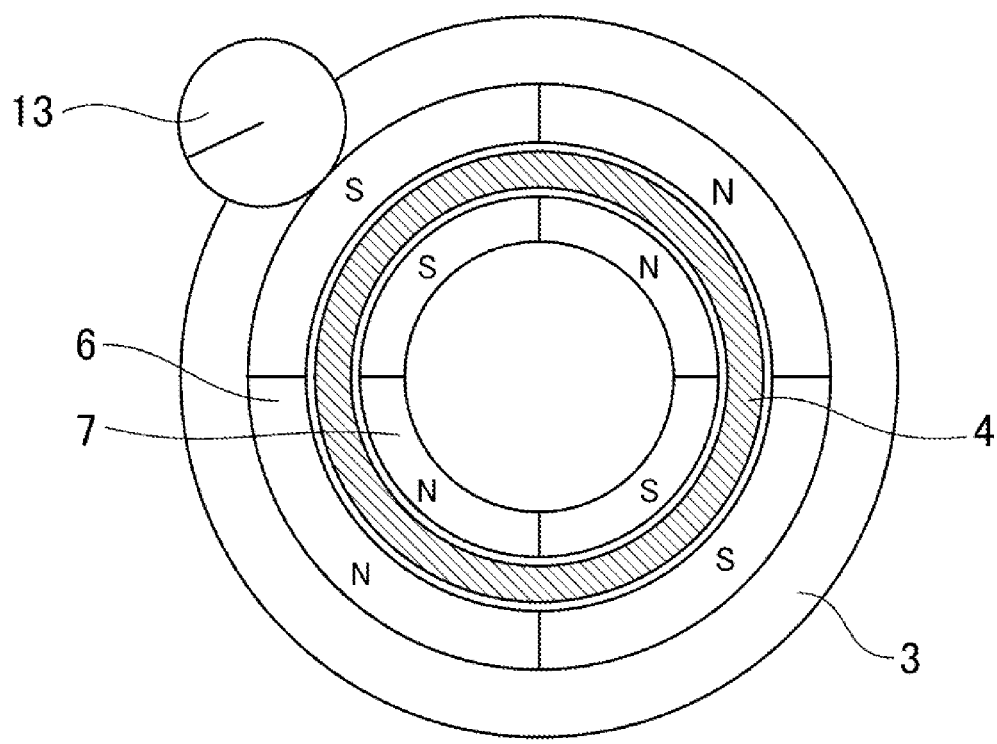

As illustrated in FIGS. 2A and 2B, the fixed magnet 7 is arranged on an inner peripheral side of the braked unit (braked member) 4, and the rotating magnet 6 is arranged on an outer peripheral side of the braked unit 4. Each of the rotating magnet 6 and the fixed magnet 7 is divided into N equal parts (four equal parts in the example in FIG. 2) in a circumferential direction, and alternately magnetized to N poles and S poles. As a result, the magnetic field penetrating the braked unit 4 is formed.

In a state in FIG. 2A, the S pole of the fixed magnet 7 and the N pole of the rotating magnet 6 face each other. That is, different poles face each other, and intensity of the magnetic field penetrating the braked unit is maximized. This state is set as a maximum braking state. In contrast, in a state in FIG. 2B, the S pole of the fixed magnet 7 and the S pole of the rotating magnet 6 face each other, that is, the same poles face each other, and the magnetic field penetrating the braked unit is minimized. This state is set as a minimum braking state.

The rotating magnet 6 is rotationally movable between the maximum braking state and the minimum braking state by the adjustment unit. Specifically, the rotating magnet 6 is fixed to the magnet gear (magnet holding gear) 17 made of resin and the like including a gear, and the magnet gear 17 is pivotally supported so as to be rotatable at an angle in a range of 0° to 90° with respect to the set plate 9. The magnet gear 17 receives transmission of rotation from the motor 12 via the reduction mechanism (reduction gear train) 16. Note that, the adjustment unit includes the motor 12, the reduction mechanism 16, and the magnet gear 17, but may include other components. In this manner, the adjustment unit (motor 12) may rotate the rotating magnet 6 relative to the fixed magnet 7. The reduction gear train 16 is a known reduction means, and is formed of three two-stage gears of the gear 13, the gear 14, and the gear 15 illustrated in FIG. 1 in one embodiment of the present disclosure, but there is no limitation, and any mode may be adopted. Herein, a reduction ratio by the reduction gear train is set to r.

Figure 3:
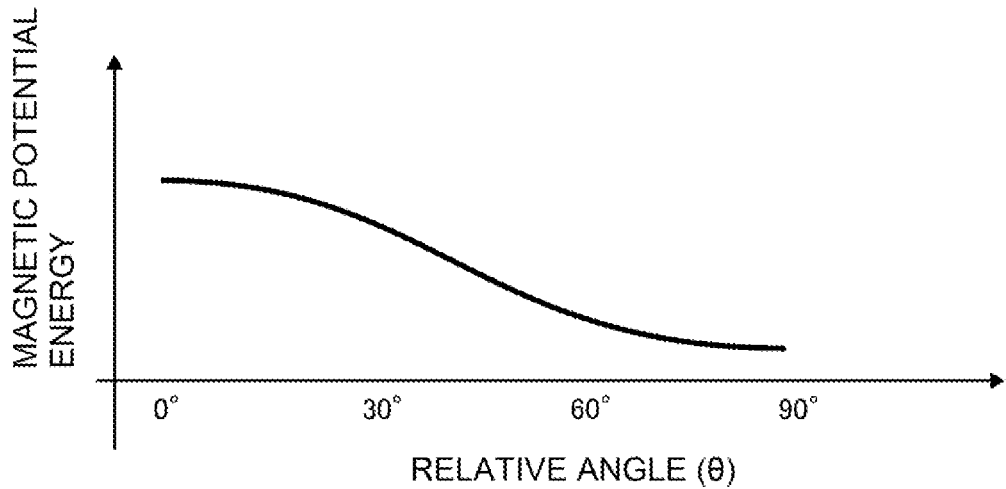
FIG. 3 is a view illustrating a relationship between a position θ of a rotating magnet with respect to a fixed magnet and magnetic potential energy of a magnetic circuit.

Next, FIG. 3 illustrates a relationship between a position θ of the rotating magnet with respect to the fixed magnet and magnetic potential energy of the magnetic circuit. As illustrated, the magnetic potential energy of the magnetic circuit is the highest in the minimum braking state in which the same poles face each other, and is the lowest in the maximum braking state in which the different poles face each other. Between them, this substantially changes with a Sin curve.

A braking device of a double bearing reel according to one embodiment of the present disclosure is a braking device of a double bearing reel that brakes a spool rotatably mounted on a reel body of a double bearing reel on which a fishing line may be wound, the braking device provided with a braked unit attached to the spool, a braking unit that applies a braking force to the braked unit, an adjustment unit capable of adjusting the braking force of the braking unit, a control unit that controls the adjustment unit, a power supply unit that supplies electric power to the control unit, and a remaining amount detection unit that detects a remaining amount of the power supply unit, in which the control unit adjusts the adjustment unit to achieve (obtain) a predetermined braking force value or sets a predetermined braking force value to a set value in a case where the remaining amount of the power supply becomes a predetermined value or smaller. Herein, a case where a remaining amount of power supply becomes a predetermined value or smaller is considered to be, for example, a state in which a value of the remaining amount of the power supply becomes 10% of a fully charged state, but there is no limitation (the same applies throughout this specification). A predetermined braking force value is, for example, the maximum braking value of the braking unit or a value input by the user in advance, but is not limited thereto, and may be appropriately set.

According to the braking device of the double bearing reel according to one embodiment of the present disclosure, backlash may be reliably prevented and fishing may be continued even in a case where the battery is exhausted by a method that does not cause an increase in size of the braking device and eventually the fishing reel.

In the braking device of the double bearing reel according to one embodiment of the present disclosure, the control unit turns off the power supply unit after adjusting the adjustment unit to achieve (obtain) a predetermined braking force value or setting to a predetermined braking force value in a case where a battery remaining amount becomes a predetermined value or smaller. In this manner, when the power supply is lost, it is possible to realize fail-safe by setting the braking force to a predetermined set value without consuming power.

In the braking device of the double bearing reel according to one embodiment of the present disclosure, the predetermined braking force value is a maximum braking value of the braking unit.

The braking device of the double bearing reel according to one embodiment of the present disclosure is further provided with a reduction mechanism, in which, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r<Mmax/C is satisfied, in a case where Mmax/T<r<Mmax/C is satisfied, the predetermined braking force value is a maximum braking force value of the braking unit, and the control unit adjusts the adjustment unit to achieve (obtain) the maximum braking force value or sets the maximum braking force value to the set value and turns off the power supply unit in a case where the remaining amount of the power supply becomes a predetermined value or smaller. In the braking device of the double bearing reel according to one embodiment of the present disclosure, in a case where the maximum braking force value is set to the set value, the braking unit is configured to generate the maximum braking force after the power supply is turned off.

In this manner, by adjusting to the maximum braking force value before the power supply is turned off or by configuring to generate the maximum braking force value after the power supply is turned off, it is possible to reliably prevent backlash and continue fishing even in a case where the battery is exhausted by a method that does not cause an increase in size of the braking device and eventually the fishing reel.

Figure 4:
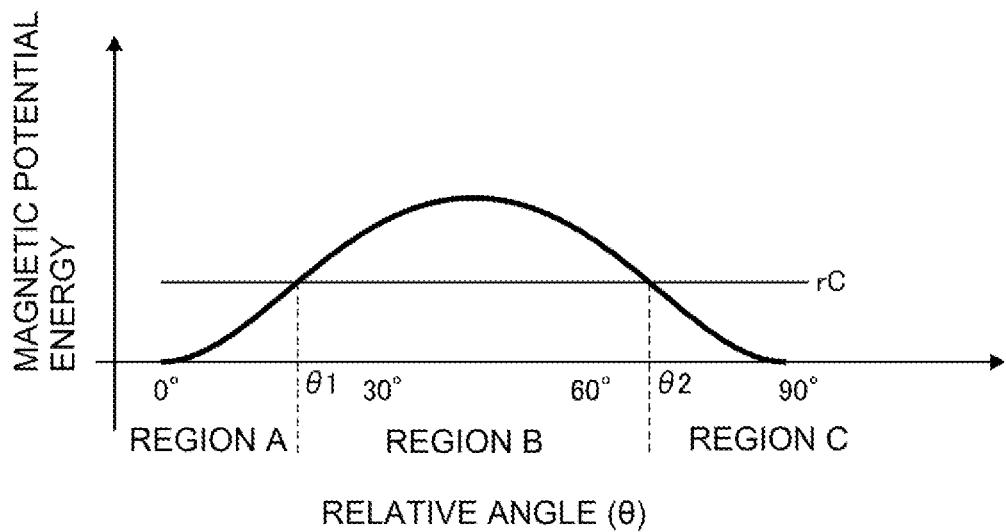
FIG. 4 is a view illustrating a relationship between the position θ of the rotating magnet with respect to the fixed magnet and magnitude F(θ) of a magnetic force acting on the rotating magnet.

FIG. 4 illustrates a relationship between the position $\theta$ of the rotating magnet with respect to the fixed magnet and magnitude $F(\theta)$ of a magnetic force acting on the rotating magnet. The magnetic force acting on the rotating magnet is obtained by differentiating the magnetic potential energy with respect to a distance, and substantially changes with a Cos curve. In each of the minimum braking state and the maximum braking state, the magnetic force becomes 0 and is a maximum magnetic force Mmax between them. The maximum braking state is a stable point, and even in a case where a minute angular change occurs, a restoring force to this point is generated. The minimum braking state is an instable point, and in a case where a minute angular change occurs, it goes to the stable point.

In this manner, when the rotating magnet is in the minimum braking state, no magnetic force is applied to the rotating magnet, but when this displaces minutely while receiving an impact or vibration from the outside, a magnetic force toward the maximum braking state, which is the stable point, starts to be generated. When the rotating magnet is between the minimum braking state and the maximum braking state, a magnetic force toward the maximum braking state is generated. Furthermore, no magnetic force is generated when the rotating magnet is in the maximum braking state. When this displaces minutely while receiving an impact or vibration from the outside, a magnetic force to return to the maximum braking state is generated.

In one embodiment of the present disclosure, in order to move the rotating magnet by the motor, a moving force of the rotating magnet by the motor needs to be larger than the magnetic force generated between the rotating magnet and the fixed magnet. That is, when energizing torque of the motor is set to T and the reduction ratio between the motor and the rotating magnet is set to r, it is necessary that r>Mmax/T is satisfied. As a result, the rotating magnet may be positioned at an arbitrary position against the magnetic force during the motor drive.

In contrast, in a case where the motor drive is stopped when the battery is exhausted or when the power supply of the control board is turned off, the motor receives torque in a rotational direction via the gear due to the magnetic force between the rotating magnet and the fixed magnet. When the motor is not energized, cogging torque generally caused by torque unevenness acting between a rotor and a stator, and holding torque C caused by friction torque of a bearing and the like are generated.

In one embodiment of the present disclosure, the reduction ratio r may be set to satisfy r<Mmax/C. Herein, holding torque of rC is generated between the rotating magnet 6 and the fixed magnet 7. FIG. 4 illustrates the torque rC. Assuming that points at which $F(\theta)=rC$ are set to $\theta 1$ and $\theta 2$, a region from 0° to $\theta 1$° is set as a region A, a region from $\theta 1$° to $\theta 2$° is set as a region B a region from $\theta 2$° to 90° is set as a region C.

In this manner, in the region B, the maximum magnetic force generated between the rotating magnet 6 and the fixed magnet 7 exceeds the holding torque of the motor, and even when the drive of the motor 12 is interrupted, the fixed magnet 7 may move toward the maximum braking state without need of power consumption or special operation.

In the minimum braking state, the braking torque to the spool becomes minimum. Therefore, in a case where the lure and the like is casted (thrown), a possibility that a flying distance is extended increases, but a risk of occurrence of backlash (line entanglement) is maximized. In contrast, in the maximum braking state (state in which the braking force becomes the highest), the braking torque to the spool becomes the maximum. Therefore, in a case where the lure and the like is casted (thrown), the flying distance is not extended, but the risk of occurrence of backlash (line entanglement) is minimized.

When a degree of line entanglement is large, a function of the reel is lost, and the user cannot continue fishing. Therefore, in a case where the battery that supplies electric power to the motor is about to be exhausted (in a case where the remaining amount of the power supply becomes a predetermined value or smaller), or in a case where the motor cannot be driven any more when the battery that supplies electric power to the motor is exhausted and the like, it is desirable to set the maximum braking state, and thus, it is possible to obtain the fishing reel that realizes fail-safe.

With the braking device 10 and the fishing reel provided with the same according to one embodiment of the present disclosure, the magnetic force generated between the rotating magnet and the fixed magnet may be made larger than the holding torque of the motor, and when the motor is deenergized, the maximum braking state may be automatically set, so that the fail-safe may be realized. At that time, since it is not necessary to externally operate each gear forming the reduction mechanism, there is no layout restriction, and it is possible to avoid an increase in size of an entire reel. Note that, it is desirable that the reduction ratio r be as small as possible while satisfying r>Mmax/T. As a result, a range of the region B may be increased. As a result, the maximum braking state may be automatically set when the motor is deenergized in almost any region.

In the braking device of the double bearing reel according to one embodiment of the present disclosure, the control unit turns off the power supply unit after adjusting the adjustment unit to achieve (obtain) a predetermined braking force value or without adjusting in a case where a battery remaining amount becomes a predetermined value or smaller. In the braking device of the double bearing reel according to one embodiment of the present disclosure, the predetermined braking force value is a braking force value after the adjustment or a braking force value when the battery remaining value becomes a predetermined value or smaller. In this manner, it is possible to maintain the adjusted braking force value or the braking force value immediately before the power supply unit is turned off (braking force when the battery remaining amount becomes a predetermined value or smaller).

The braking device of the double bearing reel according to one embodiment of the present disclosure is further provided with a reduction mechanism, in which, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r and Mmax/C<r are satisfied, and in a case where Mmax/T<r and Mmax/C<r are satisfied, the control unit turns off the power supply unit after adjusting the adjustment unit to achieve (obtain) a predetermined braking force value or without adjusting in a case where a battery remaining amount becomes a predetermined value or smaller. In this manner, it is possible to maintain the adjusted braking force value or the braking force value immediately before the power supply unit is turned off (braking force when the battery remaining amount becomes a predetermined value or smaller).

According to the braking device of the double bearing reel according to one embodiment of the present disclosure, backlash may be reliably prevented and fishing may be continued even in a case where the battery is exhausted by a method that does not cause an increase in size of the braking device and eventually the fishing reel.

In the braking device of the double bearing reel according to one embodiment of the present disclosure, the braking unit may apply the braking force even in a case where there is no electric power supply to the control unit.

Figure 5:
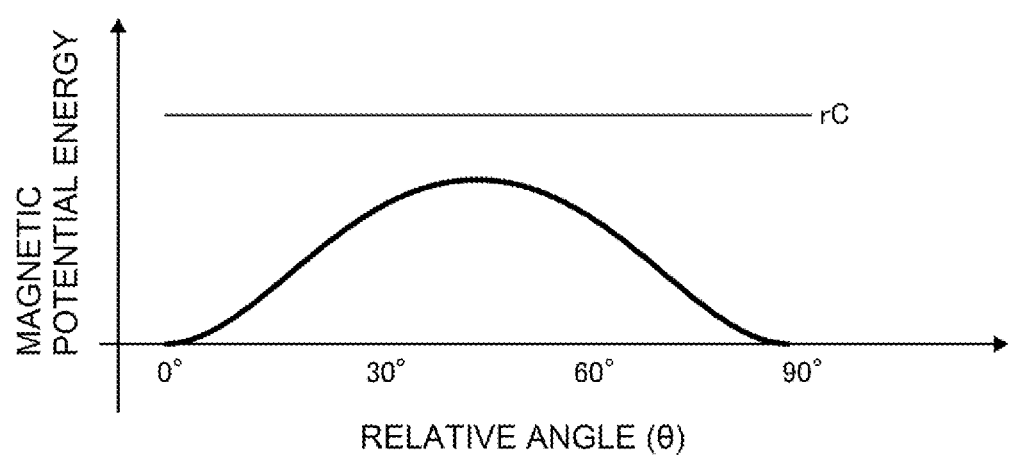
FIG. 5 is a view illustrating a relationship between the position θ of the rotating magnet with respect to the fixed magnet and magnitude F(θ) of a magnetic force acting on the rotating magnet.

Next, as in FIG. 4, FIG. 5 illustrates a relationship between the position θ of the rotating magnet with respect to the fixed magnet and magnitude F(θ) of a magnetic force acting on the rotating magnet. The magnetic force acting on the rotating magnet is obtained by differentiating the magnetic potential energy with respect to a distance, and substantially changes with a Cos curve. In each of the minimum braking state and the maximum braking state, the magnetic force becomes 0 and is a maximum magnetic force Mmax between them. The maximum braking state is a stable point, and even in a case where a minute angular change occurs, a restoring force to this point is generated. The minimum braking state is an instable point, and in a case where a minute angular change occurs, it goes to the stable point.

As in the description above, when the rotating magnet is in the minimum braking state, no magnetic force is applied to the rotating magnet, but when this displaces minutely while receiving an impact or vibration from the outside, the magnetic force toward the maximum braking state, which is the stable point, starts to be generated. When the rotating magnet is between the minimum braking state and the maximum braking state, a magnetic force toward the maximum braking state is generated. Furthermore, no magnetic force is generated when the rotating magnet is in the maximum braking state. When this displaces minutely while receiving an impact or vibration from the outside, a magnetic force to return to the maximum braking state is generated.

As described above, in order to move the rotating magnet by the motor, the moving force of the rotating magnet by the motor needs to be larger than the magnetic force generated between the rotating magnet and the fixed magnet. That is, when energizing torque of the motor is set to T and the reduction ratio between the motor and the rotating magnet is set to r, it is necessary that r>Mmax/T is satisfied. As a result, the rotating magnet may be positioned at an arbitrary position against the magnetic force during the motor drive. Therefore, in a case where the battery remaining amount becomes a predetermined value or smaller, the adjustment unit may be adjusted to achieve (obtain) a predetermined braking force value, and the power supply unit may be turned off after the adjustment. In contrast, if the adjustment is not necessary, the power supply unit may be turned off without performing the adjustment.

In contrast, in a case where the motor drive is stopped when the battery is exhausted or when the power supply of the control board is turned off, the motor receives torque in a rotational direction via the gear due to the magnetic force between the rotating magnet and the fixed magnet. When the motor is not energized, cogging torque generally caused by torque unevenness acting between a rotor and a stator, and holding torque C caused by friction torque of a bearing and the like are generated.

The reduction ratio r in the present disclosure satisfies r>Mmax/C. As a result, holding torque of rC is generated between the rotating magnet and the fixed magnet. FIG. 5 illustrates the torque rC. In this manner, the magnetic force F(θ) acting between the fixed magnet and the rotating magnet is smaller than the torque rC over an entire region. In this manner, with the braking device and the fishing reel provided with the same according to one embodiment of the present disclosure, the holding torque (holding force) of the motor may be made larger than the magnetic force generated between the rotating magnet and the fixed magnet. As a result, the fixed magnet may keep its own position even when the motor is deenergized. In a case where the battery remaining amount becomes a predetermined value or smaller, it is possible to maintain a predetermined braking force (including both after the adjustment and without adjustment) by turning off the power supply unit after adjusting the adjustment unit to achieve (obtain) a predetermined braking force value or without adjusting.

A braking device of a double bearing reel according to one embodiment of the present disclosure is a braking device of a double bearing reel that brakes a spool rotatably mounted on a reel body of a double bearing reel on which a fishing line may be wound, the braking device provided with a braked unit attached to the spool, a braking unit that applies a braking force to the braked unit, a motor capable of driving a part of the braking unit, a reduction mechanism that transmits drive of the motor to a part of the braking unit, a control unit that controls the motor, a power supply unit that supplies electric power to the motor, and a remaining amount detection unit that detects a remaining amount of the power supply unit, in which, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r<Mmax/C is satisfied or Mmax/T<r and Mmax/C<r are satisfied, and in a case where it is determined that Mmax/T<r<Mmax/Cr is satisfied, the control unit adjusts the adjustment unit to achieve (obtain) a maximum braking force value or sets the maximum braking force value to a set value and turns off the power supply unit in a case where the remaining amount of the power supply becomes a predetermined value or smaller, and in a case where it is determined that Mmax/T<r and Mmax/C<r are satisfied, the control unit turns off the power supply unit after adjusting the adjustment unit to achieve (obtain) a predetermined braking force value or without adjusting in a case where a battery remaining amount becomes a predetermined value or smaller. In this manner, after determining which condition is satisfied, the control unit may maintain the maximum braking force value by adjusting to the maximum braking force value before turning off the power supply or by configuring to generate the maximum braking force value after turning off the power supply, or maintain the adjusted braking force value or the braking force value immediately before turning off the power supply unit (braking force when the battery remaining amount becomes a predetermined value or smaller) while adjusting to a predetermined braking force or without adjusting.

The fishing reel according to one embodiment of the present disclosure is provided with any one of the above-described braking devices.

According to the braking device of the double bearing reel according to one embodiment of the present disclosure or the fishing reel provided with the same, backlash may be reliably prevented and fishing may be continued even in a case where the battery is exhausted by a method that does not cause an increase in size of the braking device and eventually the fishing reel.

Next, a control method by the braking device 10 according to one embodiment of the present disclosure is described. As described above, in one embodiment of the present disclosure, the rotating magnet is rotated relative to the fixed magnet by the above-described adjustment unit, so that the braking torque to the spool may be adjusted to a predetermined amount. As necessary, by detecting a rotational movement amount and a rotational speed of the spool, the braking torque according to each situation is set.

In a control board, a control unit formed of a motor driver that applies a current to the motor and an electric part such as a microcomputer on which a program that determines a drive amount to the motor is mounted is arranged. The motor may be positioned by a known method such as feedforward control using a stepping motor or feedback control using a position sensor. As a result, the rotating magnet may be moved to a predetermined position to apply a predetermined braking force to the spool.

The braking device of the double bearing reel according to one embodiment of the present disclosure is further provided with a remaining amount detection unit that detects the battery remaining amount, and a control unit that controls an adjustment unit (including motor), in which the control unit turns off the power supply of the braking device after the braking unit is put into a predetermined state in a case of detecting that the battery remaining amount becomes a predetermined value or smaller.

In the braking device of the double bearing reel according to one embodiment of the present disclosure, the braked unit is a conductive member, and the braking unit is a magnetic circuit including at least one rotatable magnet that applies a magnetic force to the conductive member.

In the braking device of the double bearing reel according to one embodiment of the present disclosure, the braking unit is a magnetic circuit including at least one rotatable magnet that applies a magnetic force to the conductive member, and the predetermined state is a state of being held at a position of the rotatable magnet when it is detected that the battery remaining amount becomes a predetermined value or smaller.

In the braking device of the double bearing reel according to one embodiment of the present disclosure, the reduction mechanism is one or a plurality of reduction gears.

Herein, in a state in which the battery remaining amount is sufficient, by driving the motor during casting (throwing) and appropriately adjusting the position of the rotating magnet, it is possible to apply an appropriate braking force according to a timing. This makes it possible to achieve both an increase in casting (throwing) distance and suppression of backlash. As a result, in a state in which the battery remaining amount is insufficient, the rotating magnet may be moved to a predetermined position before the power supply is turned off. The position of the rotating magnet at that time is preferably, for example, in the maximum braking state or near the same. As a result, although the casting (throwing) distance is reduced, a risk of occurrence of backlash may be reduced. This allows the user to continue fishing even in a case where the battery is exhausted. Note that, the position of the rotating magnet before the power supply is turned off may be input by the user.

As the remaining amount detection unit for detecting the battery remaining amount, there is a method of detecting a power storage remaining amount of a battery on the basis of voltage drop of the battery, for example. In this case, a configuration of directly reading a potential difference of the battery or a configuration of reading a potential difference of shunt resistor provided in an electric circuit may be considered. In addition, there are a Coulomb counter method of measuring used electric power from full charge by integrating the used current, a battery cell modeling method of correcting the Coulomb counter method by learning a temporal change and an environmental change of the battery, an impedance track method of constantly recording impedance of the battery and the like, but the method is not limited to a specific method.

A predetermined position to which it is moved when the battery remaining amount decreases is desirably the region C illustrated in FIG. 4. In the region A, since the braking torque is small, a risk of causing backlash is high. Therefore, when it is in this state before the power supply is turned off, it is preferable to turn off the power supply after the movement to the region C. In the region B, since the magnetic force exceeds the holding torque of the motor, the self-position cannot be held when the power supply is turned off, and the movable magnet may automatically move to the region C; however, since an attraction force and a holding force between the magnets are substantially balanced, the movable magnet does not move depending on a frictional state and the like, and the position of the movable magnet is not stable. Therefore, when it is in this state before the power supply is turned off, it is preferable to turn off the power supply after the movement to the region C. In the region C, since the magnetic force is lower than the holding torque of the motor, the position of the movable magnet is stabilized. Moreover, since the braking torque is large, the risk of causing backlash is low.

In the control unit of the braking device 10 according to one embodiment of the present disclosure, in a case where the battery has smaller amount, the movable magnet may be moved to the region C before the power supply is turned off. Thereafter, the power supply of the control device is turned off. As a result, a sufficient braking force may be applied to the spool even after the power supply is turned off, and a risk of causing backlash may be reduced though the flying distance of the lure and the like might decease, so that it is possible to obtain the fishing reel that realizes fail-safe.

In this manner, when the battery remaining amount becomes a predetermined value or smaller, by turning off the power supply after setting the magnetic circuit to a predetermined state, the fishing reel that reliably realizes fail-safe may be obtained even in a case of the reduction ratio in which the region B is small. At that time, since it is not necessary to externally operate each gear forming the reduction mechanism, there is no layout restriction. Therefore, it is possible to avoid an increase in size of the entire reel.

Dimensions, materials, and arrangements of the components described in this specification are not limited to those explicitly described in the embodiment, and the components may be modified to have any dimensions, materials, and arrangements that may fall within the scope of the present disclosure. Components not explicitly described in this specification may be added to the described embodiment, or some of the components described in each embodiment may be omitted.

What is claimed is:

1. A braking device of a double bearing reel that brakes a spool rotatably mounted on a reel body of the double bearing reel on which a fishing line may be wound, the braking device comprising:
   a braked unit attached to the spool;
   a braking unit that applies a braking force to the braked unit;
   an adjustment unit capable of adjusting the braking force of the braking unit;
   a control unit that controls the adjustment unit;
   a power supply unit that supplies electric power to the control unit; and
   a remaining amount detection unit that detects a remaining amount of the power supply unit,
   wherein the control unit turns off the power supply unit after adjusting the adjustment unit to achieve a predetermined braking force value or after setting the predetermined braking force value, in a case where the remaining amount of the power supply unit becomes 10% or less of a fully charged state of the power supply unit.

2. The braking device according to claim 1, wherein the predetermined braking force value is a maximum braking value of the braking unit.

3. The braking device according to claim 1, further comprising: a motor capable of driving a part of the braking unit and reduction mechanism that transmits drive of the motor to the part of the braking unit, wherein, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r<Mmax/C is satisfied, in a case where Mmax/T<r<Mmax/C is satisfied, the predetermined braking force value is a maximum braking force value of the braking unit, and the control unit adjusts the adjustment unit to achieve the maximum braking force value or sets the maximum braking force value to a set value and turns off the power supply unit, in the case where the remaining amount of the power supply unit becomes 10% or less of the fully charged state of the power supply unit.

4. The braking device according to claim 3, wherein, in a case of setting the maximum braking force value to the set value, the braking unit is configured to generate a maximum braking force corresponding to the maximum braking force value after the power supply unit is turned off.

5. The braking device according to claim 1, wherein the predetermined braking force value is a braking force value after adjustment or a braking force value when the remaining amount of the power supply unit becomes 10% or less of the fully charged state of the power supply unit.

6. The braking device according to claim 1, wherein the braking unit may apply the braking force even in a case where there is no electric power supply to the control unit.

7. A fishing reel comprising:
   the braking device according to claim 1.

8. A braking device of a double bearing reel that brakes a spool rotatably mounted on a reel body of the double bearing reel on which a fishing line may be wound, the braking device comprising:
   a braked unit attached to the spool;
   a braking unit that applies a braking force to the braked unit;
   an adjustment unit capable of adjusting the braking force of the braking unit;
   a control unit that controls the adjustment unit;
   a power supply unit that supplies electric power to the control unit; and
   a remaining amount detection unit that detects a remaining amount of the power supply unit,
   wherein, in a case where the remaining amount of the power supply unit becomes 10% or less of a fully charged state of the power supply unit, the control unit turns off the power supply unit after adjusting the adjustment unit to achieve a predetermined braking force value or without adjusting.

9. A braking device of a double bearing reel that brakes a spool rotatably mounted on a reel body of the double bearing reel on which a fishing line may be wound, the braking device comprising:
   a braked unit attached to the spool;
   a braking unit that applies a braking force to the braked unit;
   an adjustment unit capable of adjusting the braking force of the braking unit;
   a control unit that controls the adjustment unit;
   a power supply unit that supplies electric power to the control unit;
   a remaining amount detection unit that detects a remaining amount of the power supply unit; and
   a motor capable of driving a part of the braking unit and a reduction mechanism that transmits drive of the motor to the part of the braking unit,
   wherein, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r and Mmax/C<r are satisfied, and in a case where Mmax/T<r and Mmax/C<r are satisfied, the control unit turns off the power supply unit after adjusting the adjustment unit to achieve a predetermined braking force value or without adjusting, in a case where the remaining amount of the power supply unit becomes 10% or less of a fully charged state of the power supply unit.

10. A braking device of a double bearing reel that brakes a spool rotatably mounted on a reel body of the double bearing reel on which a fishing line may be wound, the braking device comprising:
   a braked unit attached to the spool;
   a braking unit that applies a braking force to the braked unit;
   an adjustment unit capable of adjusting the braking force of the braking unit;
   a motor capable of driving a part of the braking unit;
   a reduction mechanism that transmits drive of the motor to a part of the braking unit;
   a control unit that controls the motor;
   a power supply unit that supplies electric power to the motor;
   a remaining amount detection unit that detects a remaining amount of the power supply unit, wherein, in a case where a reduction ratio of the reduction mechanism is set to r, energizing torque of the motor is set to T, holding torque of the motor is set to C, and maximum torque required to move the braking unit is set to Mmax, the control unit determines whether Mmax/T<r<Mmax/C is satisfied or Mmax/T<r and Mmax/C<r are satisfied, and in a case where it is determined that Mmax/T<r<Mmax/C is satisfied, the control unit adjusts the adjustment unit to achieve a maximum braking force value or sets the maximum braking force value to a set value and turns off the power supply unit, in a case where the remaining amount of the power supply unit becomes 10% or less of a fully charged state of the power supply unit, and in a case where it is determined that Mmax/T<r and Mmax/C<r are satisfied, the control unit turns off the power supply unit after adjusting the adjustment unit to achieve a predetermined braking force value or without adjusting, in the case where the remaining amount of the power supply unit becomes 10% or less of the fully charged state of the power supply unit.

\* \* \* \* \*